Oct. 31, 1933. J. W. BRYCE 1,933,308
SPLIT AUTOMATIC CONTROL SYSTEM FOR TABULATORS
Filed Oct. 19, 1927 3 Sheets-Sheet 1
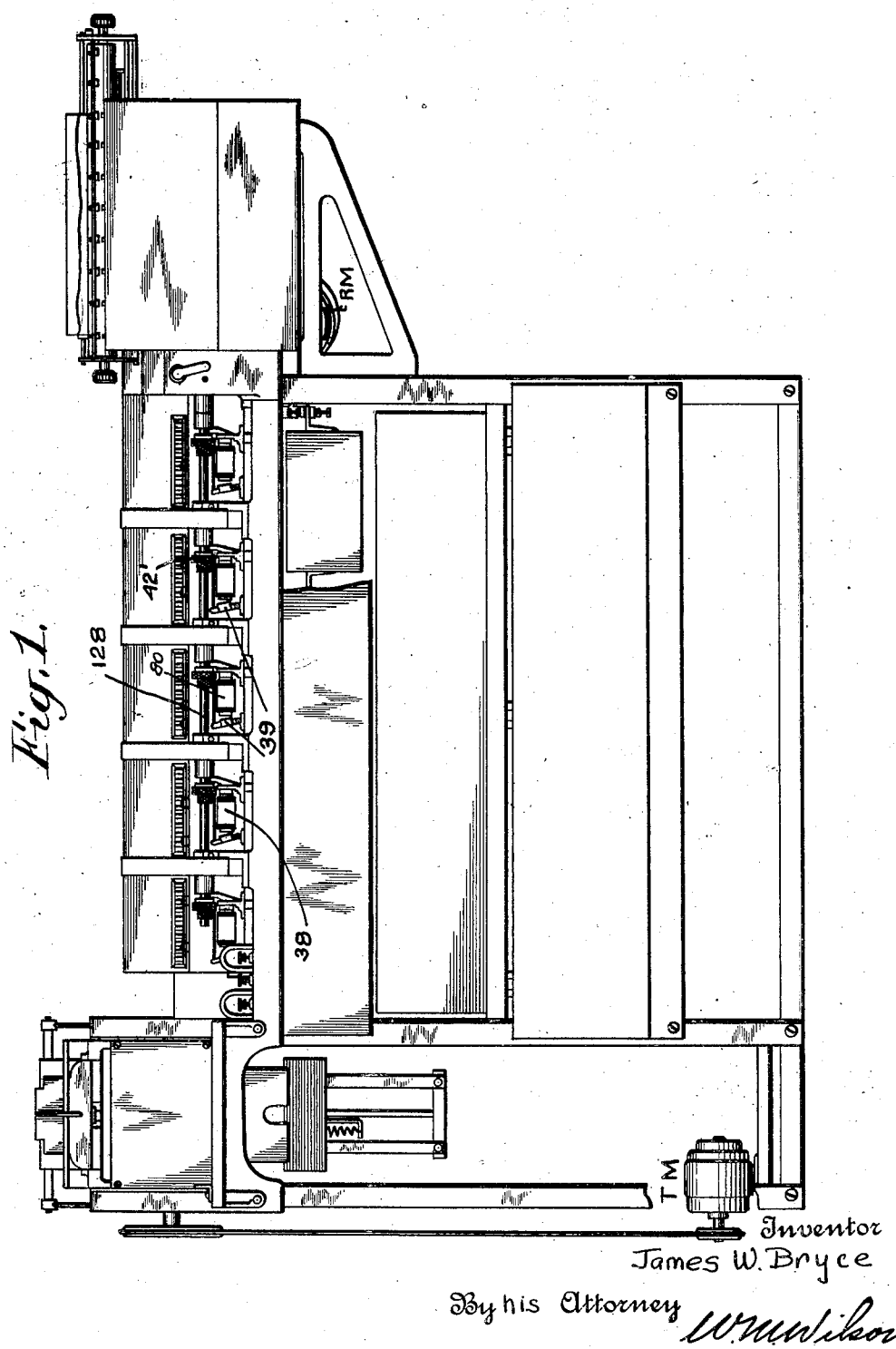
Inventor
James W. Bryce
By his Attorney Oct. 31, 1933. J. W. BRYCE 1,933,308
SPLIT AUTOMATIC CONTROL SYSTEM FOR TABULATORS
Filed Oct. 19, 1927 3 Sheets-Sheet 2
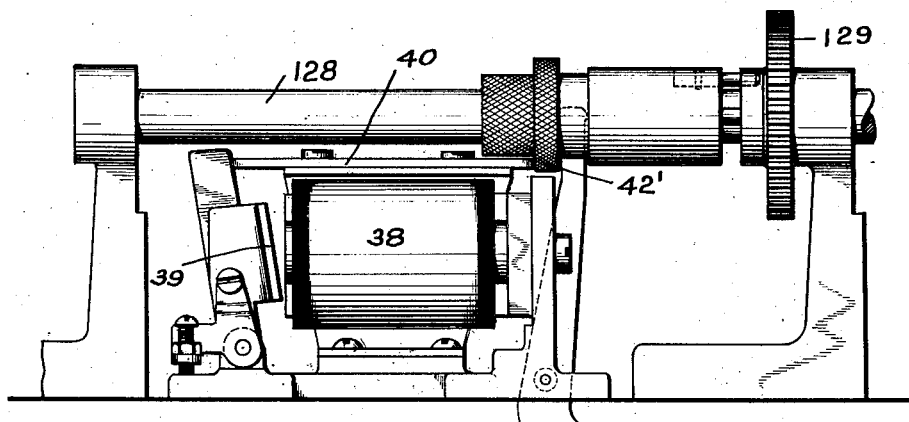
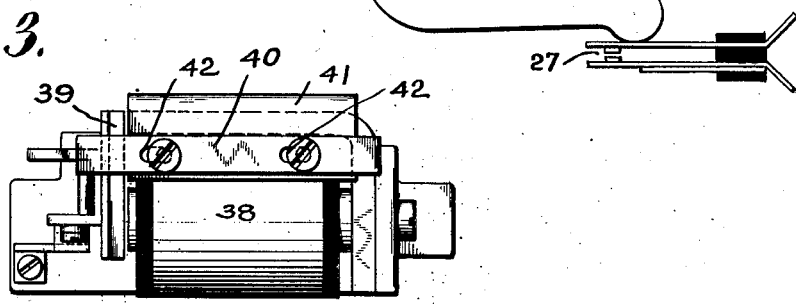
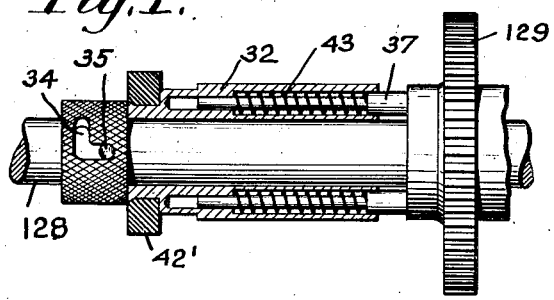
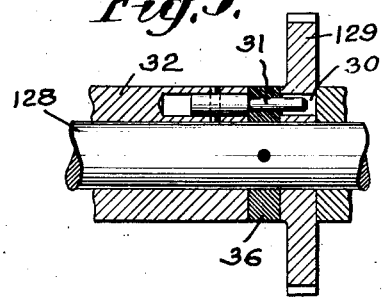
Inventor
James W. Bryce
By his Attorney Oct. 31, 1933.  J. W. BRYCE  1,933,308
SPLIT AUTOMATIC CONTROL SYSTEM FOR TABULATORS
Filed Oct. 19, 1927  3 Sheets-Sheet 3

Fig.6

Inventor
James W. Bryce
By his Attorney
W. M. Wilson

Patented Oct. 31, 1933

1,933,308

UNITED STATES PATENT OFFICE 1,933,308

SPLIT AUTOMATIC CONTROL SYSTEM FOR TABULATORS

James W. Bryce, Bloomfield, N. J., assignor, by mesne assignments, to International Business Machines Corporation, New York, N. Y., a corporation of New York Application October 19, 1927. Serial No. 227,127

26 Claims. (Cl. 235—92)

The invention concerns a group control system for tabulators and particularly such a system in which the machine may operate under a plurality of automatic controls simultaneously.

Tabulators are designed to operate upon successive records and accumulate and print items represented on the records by differentially located perforations. The records are usually in the shape of cards on each of which one item is entered, each figure of an amount being entered in a separate card column. Certain card columns bear classification data perforations which do not normally control accumulating operations but merely serve to identify the items and control machine operation to accumulate the items of each classification separately. Prior to a tabulating or adding run the cards are sorted into groups of like classification and on passing through the machine the classification perforations control machine operation so that data from successive cards are accumulated as long as the classification data do not change. A change in the classification data causes interruption of the accumulating operation and the machine may thereupon perform a total taking operation to permit printing of the totals of the accumulated data.

The present invention deals with a system in which the control data on the cards may be split into a number of sections. For example, a main section, hereinafter referred to as the major group control, may include data designating a sales office; a second section, hereinafter referred to as the intermediate group control, may include data designating the several salesmen of an office and a third section, hereinafter referred to as the minor group control, may include data designating the several articles or commodities in which the office deals. The invention is not limited to a system in which such a logical relationship between the several sections exists and in fact the sections may be entirely independent of any logical interrelationship but, as ordinarily the requirements of accounting systems make it imperative that any control system adopted be at least capable of operating with such interrelations between the several control sections, the invention will be explained in connection with such a system.

A change in the classification data in any section causes the machine to either automatically take a total or stop so that the total taking may be manually initiated. Furthermore, since the minor and intermediate classifications may be the same for successive major groups and since it is usually desirable to group all totals of each major group separately, the invention contemplates that at the end of each major group the major, intermediate and minor totals will be taken and at the end of each intermediate group the minor as well as the intermediate total will be taken. In the embodiment of the invention hereinafter described the totals will be taken successively in an order which is the reverse of that named above. That is to say, minor totals will be taken first in any group of totals while the intermediate and major totals will be taken thereafter in the last named order. Taking totals in the order above named ensures that they will be arranged in logical order on the record sheet. It is also usually desirable that the major, intermediate and minor group totals be taken successively so that the printed totals will be spaced longitudinally of the record sheet. This permits all totals to be printed by the same group of type if the machine is arranged for universal plugging of the printing elements or in any case the spacing permits the entry of bookkeeping data opposite the respective totals after the record is complete. In order to save operating time and yet secure these advantages the invention provides for only as many total taking cycles as are necessary to print the required totals, that is, if the minor group changes only one total taking cycle is provided for, if the intermediate group changes, two total taking cycles are provided for and if the major group changes, three total taking cycles are provided for.

Electrically operated machines of this type are provided with a total print shaft which formerly has been called into operation at the end of each card group to make one or more revolutions fixed in number during which it drives the printing mechanism to permit total taking and reset the accumulating elements to zero. The machines have been arranged so that the controlling cards feed first to one set of analyzing devices and a machine cycle later to another set so that successive cards may be compared as to classification data to determine whether the machine shall continue tabulating or go into a reset and total printing cycle. Also since the accumulators should ordinarily be cleared before starting a tabulating run, the machines have been arranged so that tabulating can be initiated only after a preliminary reset cycle, this being effected by a relay having contacts in the tabulating control circuits and a coil in the reset control circuits, the contacts being closed only after a reset operation and opened when the card groups change. This arrangement required a plurality of alternate card feeding and reset cycles to bring the first card from the magazine into cooperation with the adding control analyzing mechanism. A reset cycle was necessary to set up the contacts in the tabulating circuit; thereafter one card feeding cycle was necessary to feed the first card in cooperation with the first analyzing mechanism but as there was no card as yet under the adding analyzing mechanism, the machine came to a stop whereupon a second reset cycle was necessary to again set up the contacts in the tabulating control circuits. After this another card feeding cycle would be manually initiated to feed the first card to the second analyzing mechanism whereupon the machine would continue in operation automatically until the group changed.

According to the present invention these alternate tabulating or card feed cycles or reset cycles are avoided. The control contacts in the tabulating circuit are normally closed and adapted to be opened only at the end of a card group through the operation of the automatic control circuits. When cards are first placed in the magazine the machine may be started into complete automatic operation by merely closing the usual tabulating start key and holding the key closed until after the first tabulating cycle has been completed and a second cycle initiated. The first cycle of operation feeds the first card from the magazine to the first analyzing mechanism while the second cycle feeds said first card to the second analyzing mechanism. Provisions are made for automatically instituting a reset cycle at this time at the end of which reset cycle the machine automatically resumes tabulating. This scheme, while forcing a reset operation prior to the beginning of any tabulating run, nevertheless permits the machine to be started by merely depressing the usual tabulating start key.

While the invention for the purpose of illustration will be explained in connection with a three section control, it is obvious that the same principles apply to other systems in which any number of control systems may be provided, an increase in the number of sections merely necessitating duplication of the control mechanisms.

The principal object of the invention then is to provide a split automatic control for accounting machines of improved structure and new and improved cooperation of parts.

Another object of the invention is to provide a split automatic control system for accounting machines designed to take totals of different classifications successively and in which provision is made for effecting only as many total taking cycles as there are different kinds of totals to be taken.

Another object of the invention is to provide an automatic control system for accounting machines which may be split into a major group control and a sub-group control and in which a change of sub-group will initiate a total taking cycle for the sub-group total alone and a change in the major group will initiate successive total taking operations for the sub-group and major group.

Another object of the invention is to provide an automatic control system for accounting machines which may be split into successive groups and in which a change in any group will initiate a total taking cycle for itself and successive total taking cycles for all groups lower in order than itself.

Another object of the invention is to provide a tabulating machine which may be started into automatic operation by a single manual operation and in which nevertheless a total taking cycle will be forced prior to a tabulating run.

These and other incidental objects which will appear hereinafter, will be clear from the following detail description which should be read in connection with the accompanying drawings in which the same reference numerals refer to the same parts throughout the several views and in which:

Fig. 1 shows a view of a complete tabulator equipped with total taking and reset mechanism according to the invention.

Figs. 2, 3, 4 and 5 show details of magnetically operated clutch and contact for effecting total and reset of the several accumulators, and Fig. 6 shows a control circuit diagram of a tabulator equipped with an automatic control system according to the invention.

The invention may be best understood from the circuit diagram in Fig. 6 which in its general features is similar to that shown in the application of Daly and Page, Serial No. 6,980, filed February 5, 1925 (now Patent #1,762,145). The broad features of the circuit operation and the detailed operation of the machine parts are fully explained in that patent and will be very briefly covered in the present case. The changes necessary to realize the advantages of the present control system and other new features, however, will be explained in detail. The machine circuits are energized from a source of energy, indicated at B, through a double pole switch SW which when closed energizes the main lines 10 and 11. The accumulating and card feeding mechanisms are driven by the tabulating motor TM through a one revolution clutch controlled by the card feed clutch magnet 13 which is in series with the tabulating motor. The motor control relay contacts 14 in the present case are normally closed instead of open as formerly, and are arranged to be opened by the motor control relay 15 on a change of record group as will be hereinafter explained.

Neglecting for the present the special operation necessary just after cards have been placed in the magazine and assuming a card to be under the lower analyzing brushes LB and the upper analyzing brushes UB, tabulating may be started by closing the start key contacts ST whereupon a circuit will be established from main line 10 through the tabulator motor TM, card feed clutch magnet 13, start key contacts ST to the motor control relay contacts 14 normally closed, and thence through stop key contacts S, cam contacts P—3, closed during tabulating, to the other main line 11. As long as the motor control relay contacts remain closed, which will be the case as long as the card group does not change, the tabulating motor TM remains energized and the card feed clutch magnet 13 is energized at the proper time in each cycle to continue the card feed so that data may be picked from successive cards by the lower brushes LB and entered into the usual accumulating mechanism represented by the magnets 16.

Consequent to a change of card group in the major, minor or intermediate control sections the motor control relay magnet 15 will be energized, as hereinafter explained, to open the contacts 14 thus deenergizing the tabulating motor TM and the card feed clutch magnet 13 to stop the accumulating mechanism and interrupt card feed. The disengagement of the card feed clutch, as in Patent No. 1,600,413, closes contacts 17 to prepare the circuit of the reset motor RM. If the automatic reset switch 18 is closed at this time, a circuit is established through the reset motor from main line 10, through reset motor RM, reset clutch magnet 19, contacts 17 thence through cam contacts L—1, closed toward the end of each tabulating cycle, and through automatic reset switch 18 and stop key contacts S to the other main line 11. The energization of the reset clutch magnet 19 clutches the total print shaft to the reset motor which thereupon drives it to operate the printing mechanism for total printing and to reset the accumulating mechanism. Energization of the reset clutch magnet 19 also effects closure of contacts 20 closing a stick circuit about the contacts 17, cam contacts L—1 and stop key S or the manual reset key R if the latter is used said stick circuit extending through contacts 20 and cam contacts L—2 (closed when the tabulating motor TM comes to a stop), to the line 11. A second shunt is also provided extending from the reset motor RM to the cam contacts P—1, which close shortly after the reset motor starts and open again toward the end of the reset cycle, and reset control relay contacts 25 which are normally closed but opened by the energization of the reset control magnet 26 which is in series with the motor control relay 15. If these contacts 25 are closed during the first reset cycle, closure of cam contacts P—1 short circuits the reset clutch magnet 19 to effect deenergization of this magnet to permit unclutching of the reset clutch and the circuit of reset motor RM is interrupted at the end of the cycle by the opening of the contacts P—1 at the end of the cycle. If the contacts 25 are open during the first cycle, however, the reset magnet 19 remains energized and another total and reset cycle is initiated. If during this reset cycle the reset control contacts 25 close the reset clutch will disengage and the reset motor RM will stop at the end of this second cycle, while if the contacts 25 are not yet closed, another total and reset cycle will ensue. As will be hereinafter explained the contacts 25 are controlled from the group control system to force the proper number of total printing and reset cycles.

Total printing is effected through circuits including so-called zero button contacts 27 of which one is provided for each individual bank of counter elements 16. These contacts when closed connect main line 10 to a bar 28 to which the usual total print contacts 29 are connected. If the zero button contacts are closed, then, during the total printing cycle, closure of the contacts 29 under control of the counter elements will energize the printing magnets 127 to call into action the proper type for total printing in the well known manner.

In the present case as three separate kinds of totals are to be printed in successive cycles, means are provided for operating the zero button contacts 27 for each counter either manually or automatically under control of the machine. The method of operating the zero buttons will be clear from Figs. 1 to 5 of the drawings. Referring to Fig. 1 the reset shaft of the machine is shown at 128 and is driven from the total print shaft, one complete revolution for each resetting operation. Referring to Figs. 2 to 5 the reset shaft 128 has an individual gear 129 for each counter freely mounted thereon. A clutching mechanism is provided to clutch the gears 129 individually and selectively to the shaft 128 to cause them to rotate with the shaft or permit them to remain stationary during its rotation. The gear 129 is provided with a hole 30 into which may project a pin 31 fixed to a sleeve 32 slidable on the shaft 128 but arranged for rotation therewith through a bayonet slot 34 and pin 35. The pin 31 projects through a collar 36 fixed to shaft 128 and the sleeve 32 is drilled to accommodate the shanks of members 37 pressed by springs 43 against the side of collar 36. The action of the springs 43 forces the sleeve to the left as shown in Fig. 4 positioning the pin 35 to the extreme right of the bayonet slot 34 in which position the pin 31 is free of the hole 30 in the gear 129. Under these conditions rotation of the shaft 128 does not effect rotation of the gear 129. The gear may be clutched to the shaft by forcing the sleeve 32 to the right in Fig. 4 in which position it may be locked through the bayonet slot 34 by a slight twist. When so positioned the pin 31 moves into the hole 30 in gear 129 and clutches the latter to the shaft 128. This is the manual clutching operation.

Provision is also made for automatically clutching the gears 129 to the shaft 128. A magnet 38 is provided with a pivoted armature 39 whose supporting structure abuts a slide 40 carried by a bracket 41 through pin and slot connections 42. The right hand end of this slide abuts a collar 42' fixed to sleeve 32. When the magnet 38 is energized to attract its armature 39 the supporting structure of the latter forces the slide 40 to the right sliding the sleeve 32 against the action of springs 43 to position the pin 31 within the hole 30 in the gear 129 thus clutching the latter to the reset shaft. In this automatic operation there is no locking mechanism provided and the gear remains clutched to the shaft only as long as the magnet 38 remains energized. On deenergization of the magnet the springs 38 force the sleeve to the left unclutching the gear 129 from the shaft 128. Incidentally the clutching of the gear 129 to the reset shaft serves to close the zero button contacts 27 and unclutching of the gear serves to open them in the usual manner.

The automatic control system comprises the usual automatic control magnets 50 (Fig. 6) of which ten are provided in the present case and one of which should be connected in series between the upper and lower brushes of each card column from which control is desired. Each magnet is provided with the usual series contacts 51 which serve to interrupt its circuit as soon as the magnet is energized to prevent sparking at the analyzing brushes and each magnet controls a pair of automatic control contacts 52 which are normally open but closed when the corresponding control magnet is energized and when so closed remain closed until the end of the cycle when they automatically reopen. The contacts 52 which are designated by the numbers 1 to 10 are connected in series with each other and a socket 53 is provided between each pair to permit any number of the contacts to be used in series for any section of the control.

Major, intermediate and minor control relays are provided as indicated at 54, 55 and 56 which have back contacts 57, 58 and 59, respectively, and front contacts 60, 61 and 62. The back contacts 57, 58 and 59 are arranged in parallel with each other and in series with the motor relay control magnet 15 and the reset control magnet 26 so that if any relay 54, 55 or 56 is deenergized, permitting its back contacts to close, the relays 15 and 26 will be energized, interrupting tabulating and forcing successive reset cycles. The minor control relay 56 is connected to the No. 1 control contacts 52, the intermediate relay 55 is connected to a socket 63 from which it may be plugged intermediate of any of the contacts 52 and the major relay 54 is connected to a socket 64 from which it may be plugged intermediate of any of the contacts 52. Manually operated switches 65, 66 and 67 are provided to selectively connect the several relays direct to the main line 11 to prevent operation of any or all of them as automatic control elements. In the drawings plugging is indicated by the dotted lines to utilize control contacts 8, 9 and 10 for major control, contacts 4, 5, 6 and 7 for intermediate control and contacts 1, 2 and 3 for minor control. The switches 65, 66 and 67 should be in the dotted line positions for this control arrangement.

A cam contact C—1 is connected between the lower control contact 1 and the socket 63 so as to always be in parallel with the contacts 52 which are chosen for minor automatic control. Cam contacts L—3 and L—4 are similarly connected to always remain in parallel with the contacts 52 which are chosen for intermediate and major control respectively. These cam contacts are normally closed but open instantaneously toward the end of each tabulating cycle after the contacts 52 have been set up.

When the minor relay 56 is energized its circuit extends as follows: Main line 10, wire 97, contacts 62 of said relay 56 (closed when the relay is energized), the windings of relays 56 and 81; thence the circuit may extend alternatively either through cam contacts C—1, L—3, L—4, to line wire 11, or through all the control contacts 52 in series, the top plug wire, socket 71, upper card lever contacts 72, and wire 70, to line wire 11.

It will thus be seen that failure of any of the minor control contacts 52 to make during any cycle causes deenergization of the minor control relay at the time cam contacts C—1 open. The major and intermediate relays, however, will not be affected since under the foregoing conditions none of the major and intermediate control contacts 52 are open, thereby maintaining the circuits for both the major and intermediate relays. Deenergization of the minor control relay 56 causes it to close its contacts 59 thereby energizing the motor control relay 15 and reset control magnet 26 over a circuit extending from line wire 10, wire 97, contacts 59, relay 15 and relay 26 to line wire 11.

The circuit for the intermediate control relay 55 extends from line wire 10, wire 97, contacts 61 of said relay (closed when the latter is energized); the windings of relays 55, 90, and 75; and wire 137; thence the circuit may extend either through wires 136, 135, and cam contacts L—3, L—4 in series, to the line wire 11, or to plug socket 63, the plug wire, major and intermediate control contacts 52, the top plug wire, socket 71, contacts 72, and wire 70, to line wire 11.

It is plain that failure of any of the intermediate control contacts 52 to close will cause the intermediate control relay 55 to become deenergized when cam contacts L—3 open and the minor relay 56 will also become deenergized as described above since the circuits for both must be maintained through the intermediate control contacts 52. The deenergization of relays 55 and 56 will cause the energization of the motor control relay 15 and reset control relay 26 over a circuit exactly as described above since the points 58, 59 of relays 55, 56 are in parallel.

The circuit for the major control relay 54 extends from line wire 10, wire 97, contacts 60 of relay 54 (closed when said relay is energized), and the winding of relay 54; thence the circuit may extend either through cam contacts L—4 to line wire 11, or through switch 67, socket 64, the plug wire, the major control contacts 52, the top plug wire, socket 71, contacts 72, and wire 70, to line wire 11. If any of the major control contacts 52 are open when cam contacts L—4 open, all three relays 54, 55, 56 will be deenergized since the circuits for all three relays must be maintained through the major control contacts 52 when contacts L—4 open. As before, the circuit for the motor control relay 15 and reset control relay 26 will be set up through the contacts 58, 59 of relays 55, 56, and also through contacts 57 of major control relay 54.

Summing up the foregoing description briefly, it is clear that an interruption in the circuit of major control relay 54 as a consequence of one or more of the major control contacts 52 not having closed causes all three relays 54, 55, 56 to be deenergized; interruption of the circuit of intermediate control relay 55 due to any of the intermediate control contacts 52 being open causes only relays 55, 56 to be deenergized, while any open minor control contacts 52 will cause only the minor control relay 56 to be deenergized. As will be described later herein, it requires as many total taking and resetting cycles to be carried through as there are changes in classification numbers to deenergize the motor control relay 15 and permit the motor TM to be restarted to tabulate further groups of cards.

Assuming then that the cards under the upper and lower brushes fail to agree in their major group classification at least one of the major control contacts 8, 9 and 10 will fail to make and all control relays 54, 55 and 56 will be deenergized closing their back contacts 57, 58, 59 to energize motor control relay 15, interrupting tabulating, and reset control magnet 26 to force successive reset cycles. Toward the end of each reset cycle contacts LP—6, LP—7 and LP—8 close momentarily in the order named each contact closing and opening again before the next in order closes. These contacts are for the purpose of setting up the control relays 54, 55 and 56, respectively. The contact LP—8 is connected directly to the main line 10 through wires 89 and 97 and also to the minor control relay 56, the circuit extending to main line 11 through the contacts C—1, L—3 and L—4. The contacts LP—7 are connected to the intermediate relay 55 and to the main line 10 through front contacts 62 of the minor control relay 56 so that the intermediate control relay 55 can only be set up if the minor control relay 56 is set up. Contacts LP—6 are connected to the major control relay 54 through contacts 76 of the relay 75 and to the main line 10 through front contacts 61 of intermediate relay control 55 and wire 97 so that the major control relay 54 can only be set up if the intermediate relay control 56 has previously been set up. The function of the relay 75 and contacts 76 will be explained later.

During the first reset cycle after the major group change the closure of contacts LP—6 and LP—7 is without effect but the closure of contacts LP—8 reenergizes the minor control relay 56. The circuit of the motor control relay 15 and the reset control magnet 26 is still made through the back contacts 58 and 57 of the intermediate and major relays. The contacts 25 thus remain open and a second reset cycle ensues. During this second reset cycle the closure of contacts LP—6 is without effect but the closure of contacts LP—7 sets up the intermediate control relay 55. Motor control relay 15 and reset control magnet 26, however, remain energized through the back contacts of major control relay 54 and a third reset cycle follows. Toward the end of this third reset cycle the closure of cam contacts LP—6 sets up the major relay 54 thus deenergizing motor control relay 15 permitting contacts 14 in the tabulating machine to close and contacts 25 in series with the cam contacts P—1 close whereupon the reset motor stops at the end of this third cycle and tabulating may be resumed.

It will be noted that a change in the minor group alone will not deenergize the intermediate and major control relays and in this case the minor control relay 56 will be set up at the end of the first reset cycle whereupon the motor control relay 15 and reset control magnet 26 will be deenergized permitting only one total print and reset cycle. If there is a change in the intermediate group but not in the major group, minor control relay 56 and intermediate relay 55 will be deenergized but major control relays 54 will remain energized. In this case two reset cycles will ensue at the end of which tabulating may be resumed.

Incidentally from the particular wiring adopted it will be noted that if the group change occurs in the intermediate section and not in the major section, the closure of the contact LP—6 during the first reset cycle would tend to set up the intermediate relay 55 through the front contacts 60 of the major control relay 54. To prevent this a major set up relay 75 is provided in series with the intermediate control relay 55 whose contacts 76 are opened when the relay 55 is deenergized. Said contacts 76 are in series with the cam contacts LP—6 thus permitting the intermediate relay to set up only through its circuit extending from the front contacts 62 of minor relay 56.

It will be clear from the description thus far that one, two or three reset cycles ensue on a group change in the minor, intermediate or major sections, respectively. The minor, intermediate and major totals are printed during the first, second and third reset cycles respectively. It may be assumed that the counter bank marked X is plugged to print minor totals, the counter bank marked Y is plugged to print intermediate totals and the counter bank marked Z is plugged to print major totals. As previously explained, totals from any bank can only be printed when the zero buttons contacts 27 are closed. The zero button contacts and the clutch of gear 129 (Figs. 2 to 5) of the X bank which is to print minor totals are locked in manually through the bayonet slot connection. During the first total taking and reset cycle, then, the bank X prints its minor total and clears. The zero buttons of banks Y and Z are magnetically controlled through magnets 38 and 80 respectively. The magnet 38 is controlled through a relay 81 in series with the minor group control relay 56 which relay 81 has contacts 82 in circuit with the magnet 38. Toward the end of the first reset cycle when the minor group control relay 56 is energized the relay 81 is also energized closing contacts 82. During the second reset cycle cam contacts LP—9 close and remain closed during substantially the entire cycle thereby energizing zero button magnet 38 through a switch 150 (closed) to effect total taking on the bank Y whereby to print the intermediate total and reset the accumulating elements. The circuit of the zero button magnet 38 in this case extends from the main line 11 through cam contacts L—4 and L—3 and wires 135, 136, 137, 138, 86 and 87 to relay contacts 82 thence through magnet 38, switch 150, cam contacts LP—9 and wires 88, 89, and 97 to the other main line 10.

During the second reset cycle also a relay 90 in series with intermediate group control relay 55 is energized to close its contacts 91 whereupon at the beginning of the third reset cycle closure of cam contacts LP—11 energizes a stick relay 95, the circuit extending from the main line 10 through stick relay 95 and cam contacts LP—11 to relay contacts 91 thence through relay contacts 82 to the main line 11 through wires 87, 86, 138, 137, 136, 135, and cam contacts L—3, L—4, to line wire 11. The closure of contacts 96 of stick relay 95 establishes a circuit for the zero button magnet 80 to permit the major total to be taken from the bank Z and the accumulating elements of this bank to be restored. The circuit of the zero button magnet 80 in this case extends from main line 10, through wires 97, 89 and 88 to cam contacts LP—10 a switch 151 (closed), thence through zero button magnet 80 to stick relay contacts 96 and through contacts 82 to the other side of the line 11 through wires 87, 86, 138, 137, 136, 135, and cam contacts L—3, L—4, to line wire 11. The stick circuit remains closed but is again opened when the minor control becomes effective at the end of the next group of cards deenergizing relay 81 to open the contacts 82. The total taking control is thus conditioned for the following total taking control.

The switches 150, 151 and the switches 65, 66, 67 are provided for the purpose of rendering the automatic group control mechanism and circuits and the automatic resetting circuits ineffective, to permit the machine to be operated as a simple tabulator. The switches 65, 66, 67 when in the position shown in Fig. 6 shunt all the contacts 52 and also the cam contacts C—1, L—3, L—4 thereby preventing deenergization of relays 54, 55, 56. The switches 150, 151 prevent energization of the magnets 38, 80, thereby preventing automatic resetting of the counters.

The present machine is designed to avoid the alternate manually initiated card feeding and reset cycles which were formerly necessary to get the first card of a stack in the magazine under the lower brushes. A relay 100 is provided in series with upper card lever contact 72 so that this relay will be energized whenever cards are under the upper brushes. The contacts 101 of this relay are in parallel with the cam contacts C—1 and short circuit them when the relay is deenergized. Lower card lever relays 102 and 103 are in series with the lower card lever contacts 104 so that they will be energized whenever cards are under the lower brushes. The contacts 105 and 106 of these relays respectively, short circuit the cam contacts L—3 and L—4 respectively, whenever the relays are deenergized.

Assuming now that cards have just been placed in the magazine, the contacts 101, 105, and 106 will all be closed thereby energizing the major, intermediate, and minor control relays 54, 55, and 56. The start key contacts ST are closed and held closed long enough for the first tabulating cycle to be completed and a second tabulating cycle to become initiated. During the first cycle the first card will be fed down to the upper brushes, closing contacts 72 and opening contacts 101, thereby removing the short circuit on the contacts 52 in the minor group control section. The opening of contacts C—1 during the first cycle has no effect, as the upper card lever contacts 72 close near the end of the cycle after the contacts C—1 have reclosed. The minor control contacts 52 and contacts 101 being open, the opening of contacts C—1 during the second cycle deenergizes the minor group control relay 56 allowing its back contacts 59 to close, thereby energizing the motor control relay 15 to interrupt card feed and force a reset cycle at the end of the second tabulating cycle. During the second cycle the card lever contacts 104 will close but will have no effect, as the cam contacts L—4, L—3 reclose before the card lever contacts 104 close so that the shunt on the control contacts 52 in the major and intermediate control sections is not removed and the major and intermediate relays remain energized during the second cycle. A single reset cycle ensues automatically at the end of the second cycle through the starting circuit set up by cam contacts L—1 and contacts 17. During this reset cycle the minor relay 56 will be set up and the motor control relay 15 deenergized permitting the motor TM to restart automatically at the end of the resetting cycle when cam contacts P—4 close. Since cards are now under both the upper and lower brushes the machine begins to feed cards with the group control circuits in readiness to sense a change in the classification numbers. The feeding of the cards will continue until a change in card group occurs.

When the last card is fed from the magazine and leaves the upper brushes upper card lever contacts 72 which are in series with the group control contacts 52 open thereby opening the circuits of the major, minor and intermediate group control relays 54, 55 and 56 to provide for total taking on all three classifications after this last card has passed the lower brushes.

The invention has now been described in connection with what is at present believed to be its preferred embodiment, but it will be understood that many modifications and rearrangements will readily occur to those skilled in the art which are well within the scope of the present invention. I intend to be limited therefore only as indicated by the scope of the following claims.

I claim:

1. An accounting machine comprising a plurality of accumulators which may consist of more than two adapted to receive and totalize items of seriated classifications, total taking mechanism and means for operating the same to take totals in seriation from the several accumulators which may consist of a group of more than two, each with a separate total taking operation and means for limiting the number of total taking operations to the actual number of totals to be taken.

2. An accounting machine comprising a plurality of accumulators which may consist of more than two adapted to receive and totalize items of seriated classifications, total taking mechanism and means for operating the same to take totals in seriation from the several accumulators which may consist of a group of more than two, means associated with each accumulator to initiate a total taking operation on the same and means controlled thereby for initiating a sequential total taking operation on the next accumulator in order.

3. An accounting machine comprising a plurality of accumulators which may consist of more than two adapted to receive and totalize items of seriated classifications, total taking mechanism and means for operating the same to take totals in seriation from the several accumulators which may consist of a group of more than two, means associated with each accumulator to initiate a total taking operation on the same and means associated with each accumulator except the last in the series for initiating a sequential total taking operation on the next accumulator in order.

4. A tabulator comprising a plurality of record controlled accumulators which may consist of more than two adapted to receive and totalize items of different classifications, total taking mechanism for taking totals from the several accumulators which may consist of a group of more than two successively by repeated total taking operations and record controlled means for selecting the accumulators from which totals are to be taken and for limiting the number of repeated total taking operations to the actual number of accumulators selected.

5. A record controlled accounting machine comprising record controlled means for controlling machine operation in accordance with classification data divided into sections on records which sections may be more than two in number, means called into operation by said first named means for performing a succession of repeat operations which may be more than two in number on a change in classification data and means controlled from the several classification sections for limiting the number of repeat operations in accordance with the section in which the classification data changes.

6. A record controlled accounting machine comprising record controlled means for controlling machine operation in accordance with classification data divided into serially arranged sections which sections may be more than two in number, on records, means called into operation by said first named means for performing a succession of repeat operations which may be more than two in number on a change in classification data and means controlled from the several classification sections for selecting the number of repeat operations according to the serial order of the section in which the classification data changes.

7. A split automatic control system for a record controlled accounting machine which includes accumulating mechanism and total taking mechanism comprising means for operating upon records bearing classification data divided into serially arranged sections which sections are more than two in number to interrupt operation of the accumulating mechanism and condition the total taking mechanism for successive totals which are more than two in number on a change of classification data and means for operating upon the records to determine the number of successive total taking operations.

8. A split automatic control system for a record controlled accounting machine which includes accumulating mechanism and total taking mechanism comprising means for operating upon records bearing classification data divided into serially arranged sections which sections are more than two in number to interrupt operation of the accumulating mechanism and condition the total taking mechanism for successive totals which are more than two in number on a change of classification data and means for selecting the number of successive total taking operations according to the section in which the classification data changes.

9. A split automatic control system for a record controlled accounting machine which includes cyclically operable total taking mechanism comprising means for operating upon records bearing classification data in serially arranged sections which sections are more than two in number and means controlled thereby to initiate operation of said total taking mechanism for different numbers of operating cycles of which there are more than two according to changes of classification data in the different sections.

10. A split automatic control system for a record controlled accounting machine comprising means for operating upon records bearing classification data in serially arranged sections which sections may be more than two in number, an accumulator corresponding to each section and means operable upon a change in classification data in any section for taking totals from the accumulator corresponding to that section and the accumulators corresponding to the classification sections of lower order.

11. A split automatic control system for a record controlled accounting machine comprising means for operating upon records bearing classification data in serially arranged sections which sections may be more than two in number, an accumulator corresponding to each section and means operable upon a change in classification data in any section for taking totals which may be more than two in number successively from the accumulators corresponding to the classification section in which the change occurs and all accumulators of lower order.

12. A split automatic control system for a record controlled accounting machine comprising means for operating upon records bearing classification data in serially arranged sections which sections are more than two in number, an accumulator corresponding to each section and means operable upon a change in classification data in any section to initiate successive uninterrupted total taking operations which are more than two in number on the accumulators beginning with that corresponding to the lowest order classification section and ending with the accumulator corresponding to the classification section in which the change occurs.

13. A split automatic control system for a record controlled accounting machine comprising means for operating upon records bearing classification data in serially arranged sections which sections are more than two in number, an accumulator corresponding to each classification section, means operable upon a change in classification data in any section to initiate a series of successive total taking operations which are more than two in number on the accumulators, beginning with that of the lowest order and means for interrupting the series of total taking operations after a total has been taken from the accumulator corresponding to the classification section in which the change occurs.

14. A cyclically operable record controlled accounting machine including record feeding mechanism and first and second record analyzing means, accumulating mechanism controlled by said analyzing means and reset mechanism for the same and means for initiating a series of machine cycles including a single reset cycle for resetting all accumulators and a plurality of record feeding cycles to feed an initial record to the second record analyzing means.

15. A record controlled accounting machine comprising an automatic control system with means for splitting the same into a plurality of separate controlling sections, an accumulator associated with each section, a single element for controlling total taking from each accumulator, each element being controlled from a different section of the automatic control system, means for delaying the operation of the controlling elements in order to permit one only to operate at a time and means for interrupting the total taking operation when all selected controlling elements have operated.

16. A record controlled accounting machine comprising an automatic control system with means for splitting the same into a plurality of separate controlling sections, an accumulator associated with each section, a single separate element for controlling resetting of each accumulator, each element being controlled from a different section of the automatic control system, means for delaying the operation of the controlling elements in order to permit one only to operate at a time and means for interrupting the resetting operation when all selected elements have operated.

17. A record controlled accounting machine comprising an automatic control system with means for splitting the same into a plurality of separate controlling sections arranged in serial order, an accumulator associated with each section, a single element for controlling total taking from each accumulator, each element being controlled from a different serial section of the automatic control system, means associated with each element on operation thereof to initiate operation of the next lower element to itself in serial order and means for interrupting the total taking operation when all such selected elements have operated.

18. A record controlled accounting machine comprising an electrical automatic control system with means for splitting the same into a plurality of separate controlling sections, an accumulator associated with each section, a single separate magnet controlled from each section for initiating total taking on the associated accumulator, means for delaying the operation of the several magnets in order to permit one only to operate at a time and means for interrupting the total taking operation when all selected magnets have operated.

19. A record controlled accounting machine comprising an electrical automatic control system with means for splitting the same into a plurality of separate controlling sections arranged in serial order, an accumulator associated with each section, a single separate magnet controlled from each section for initiating the operation of total taking on the associated accumulator, and means controlled by each magnet for controlling the next lower magnet in serial order to initiate a series of successive total taking operations when any magnet other than the lowest in serial order is operated.

20. In a record controlled machine comprising in combination a plurality of accumulators exceeding two in number, a total taking mechanism for said accumulators, controlling means for causing said total taking mechanism to take totals in successive cycles in an invariable order from all of said accumulators, said controlling means having provisions selecting a certain accumulator for a total taking operation by a single cycle of operation.

21. In a record controlled machine including more than two accumulators, a total taking mechanism for said accumulators, and a controlling means for selecting two or more accumulators for a total taking operation by a number of successive cycles in an invariable order and corresponding to the number of accumulators selected.

22. In a record controlled machine including a group of more than two accumulators, a total taking mechanism therefor, a controlling means for causing a sequential total taking operation in an invariable order by a plurality of cycles corresponding to the number of accumulators and having provisions for selecting a single accumulator for a total taking operation, and means whereby a total taking operation from a single accumulator is limited to a single cycle of machine operation.

23. An accounting machine comprising a plurality of accumulators which consists of more than two, total taking mechanism, means for selecting any number of said accumulators which may consist of more than two from said plurality of accumulators for sequential total taking operations, means for operating the total taking mechanism to take totals from the selected accumulators in uninterrupted succession and in an invariable order, and means to limit the operations of the total taking mechanism to the number necessary to take totals from the selected accumulators and to interrupt the operation of the total taking mechanism after the last successive total taking operation.

24. An accounting machine comprising a plurality of accumulators which consists of more than two, total taking mechanism, means for selecting all or any number of said accumulators which may consist of more than two from said plurality of accumulators for sequential total taking operations, means for operating the total taking mechanism to take totals from the selected accumulators in uninterrupted succession and in an invariable order, and means to limit the operations of the total taking mechanism to the number necessary to take totals from the selected accumulators and to interrupt the operation of the total taking mechanism after the last total taking operation.

25. An accounting machine comprising a plurality of accumulators which consists of more than two, resetting mechanisms, means for selecting any number of said accumulators which may consist of more than two from said plurality of accumulators for sequential resetting operations, means for operating the resetting mechanism to reset the selected accumulators in uninterrupted succession and in an invariable order, and means to limit the operations of the resetting mechanism to the number necessary to reset the selected accumulators and to interrupt the operation of the resetting mechanism after the last successive resetting operation.

26. An accounting machine comprising a plurality of accumulators which consists of more than two, resetting mechanisms, means for selecting all or any number of said accumulators which may consist of more than two from said plurality of accumulators for sequential resetting operations, means for operating the resetting mechanism to reset the selected accumulators in uninterrupted succession and in an invariable order, and means to limit the operations of the resetting to the number necessary to reset the selected accumulators and to interrupt the operation of the resetting mechanism after the last resetting operation.

JAMES W. BRYCE.